United States Patent [19]

Hewison

[11] Patent Number: 4,878,793
[45] Date of Patent: Nov. 7, 1989

[54] SCREW THREADED FASTENER

[75] Inventor: George D. Hewison, Twyford, Great Britain

[73] Assignee: ITW, Ltd., Camberley, England

[21] Appl. No.: 241,891

[22] Filed: Sep. 8, 1988

[30] Foreign Application Priority Data

Sep. 8, 1987 [GB] United Kingdom ............... 8721048

[51] Int. Cl.$^4$ .................. F16B 23/00; F16B 25/00
[52] U.S. Cl. ................... 411/387; 411/399; 411/413
[58] Field of Search ............. 411/386, 387, 399, 412, 411/413, 531, 369

[56] References Cited

U.S. PATENT DOCUMENTS

| 3,478,639 | 11/1969 | Gruca | 411/531 |
| 3,682,507 | 8/1972 | Wand | 411/413 |
| 4,621,963 | 11/1986 | Reinwall | 411/369 |
| 4,655,661 | 4/1987 | Brandt | 411/412 |

FOREIGN PATENT DOCUMENTS 267153 5/1988 European Pat. Off. ............ 411/387

Primary Examiner—Neill R. Wilson
Attorney, Agent, or Firm—Schwartz & Weinrieb

[57] ABSTRACT

A screw threaded fastener particularly intended for use in fastening corrugated sheet material to metal purlins comprises a drilling point (1), a head (2), a first self-tapping screw threaded portion (3) adjacent the drilling point (1), a second screw threaded portion (4) adjacent the head (2), the second screw threaded portion (4) having a larger crest diameter than the first screw threaded portion (3), and an unthreaded portion (5) extending between the first and second screw threaded portions. The diameter of the part of the fastener carrying the second screw threaded portion (4) is generally larger than that carrying the first screw threaded portion (3) and the fastener also includes a transition portion (6) between its portions of smaller and larger diameter and in particular, interposed between the trailing edge portion of the first screw threaded portion (3) and the leading edge portion of the unthreaded portion (5). The transition portion (6) includes forming portions (8) projecting outwardly from the axis of the fastener no further than the diameter of the larger diameter portion. The forming portions (8) in use, enlarge the diameter of a hole drilled within the sheet material by means of the drilling point (1) so as to allow passage of the larger diameter portion of the fastener through the sheet material. Such a fastener is formed by means of a forward extrusion step which reduces its diameter and which, simultaneously, forms the forming portions (8) upon the transition portion (6).

7 Claims, 2 Drawing Sheets

SCREW THREADED FASTENER

FIELD OF THE INVENTION

BACKGROUND OF THE INVENTION

The present invention relates generally to screw-threaded fasteners, and more particularly to self-tapping screw-threaded fasteners having first and second threaded portions axially separated by means of an unthreaded portion with the diameter of the second threaded portion being greater than that of the first threaded portion, and wherein a specially configured, hole-enlarging transition portion or zone is defined between the trailing end portion of the first threaded portion and the leading end portion of the unthreaded portion so as to permit passage of the second threaded portion through a component to be fastened to a support element.

Our earlier patent specification GB-A-1270545 describes and claims a screw threaded fastener which is particularly arranged for fixing a corrugated metal roofing sheet onto underlying metal purlins. The fastener includes a self-drilling point, a first self-tapping screw thread adjacent the drilling point, an unthreaded region, a head and a second screw threaded portion adjacent the head. In use, the drilling point firstly drills a hole within the corrugated sheet material and the first screw threaded portion forms a threaded region within the sheet metal component. Then, with the sheet metal component within the vicinity of the unthreaded portion of the fastener the drilling point drills a hole within the underlying purlin. Once this has been completed the first screw threaded portion cuts a thread within the underlying purlin and, as the fastener is screwed into the purlin the second screw thread engages the roofing sheet and urges it rearwardly so as to clamp it between the second screw threaded portion and the head of the fastener and of course any waterproof sealing washer interposed between the top of the roofing sheet and the head of the fastener. Such fasteners have been successful and used widely.

Our earlier patent specification GB-A-1277044 describes an improvement of the fastener described in GB-A-1270545 by fabricating the fastener by means of a process including two forward extrusion steps using three different punch tools so that the diameter of the fastener adjacent the head is greater than the diameter of the fastener adjacent the drill point. This enables the second screw threaded portion to have a larger diameter so that the crest diameter of the second screw thread is much greater than that of the first screw thread. This provides a more positive engagement of the roofing sheet with the second screw threaded portion and so forms a more reliable seal between the head of the fastener and the roofing sheet. In order to provide clearance for the larger diameter portion of the fastener the process also includes a subsequent forging step during which wings are formed upon the shank of the fastener upstream of the trailing edge portion of the first screw thread. The wings firstly ream out the screw thread formed withing the roofing sheet by the means of the first screw threaded portion and provide an enlarged hole which allows sufficient clearance for passage therethrough of the larger diameter portion of the fastener, and secondly, when and if they come into contact with the upper face of the purlin, they prevent overdriving of the fastener.

Forming the blanks for the fastener so as to form the portions of larger diameter and also the subsequent forging operation so as to produce the upstanding wings leads to a production process for these fasteners which is expensive with the result that while the fasteners are technically superior they are more expensive to manufacture which makes it more difficult for them to compete in the market place with fasteners made in accordance with patent specification 1270545.

SUMMARY OF THE INVENTION

According to a first aspect of this invention a screw threaded fastener particularly intended for use in fastening corrugated sheet material to metal purlins and comprising a drilling point, a head, a first self-tapping screw threaded portion adjacent the drilling point, a second screw threaded portion adjacent the head, the second screw threaded portion having a larger crest diameter than that of the first screw threaded portion, and an unthreaded portion extending between the first and second screw threaded portions, the diameter of the portion of the fastener carrying the second screw threaded portion being generally larger than that carrying the first screw threaded portion and the fastener also including a transition portion between first screw threaded and unthreaded portions is characterised by the transition portion including forming means which project outwardly from the axis of the fastener no further than the diameter of the larger diameter portion and which, in use, enlarges the diameter of the hold drilled within the sheet material by means of drilling point so as to allow passage of the larger diameter portion of the fastener through the sheet material.

According to a second aspect of this invention a method of forming a screw threaded fastener particularly intended for use in attaching a corrugated roofing sheet to an underlying metal purlin includes the steps of forward extrusion of part of a fastener blank through a die which reduces its diameter and which, simultaneously, forms forming means upon a transition region defined between the smaller and larger diameter portions of the blank, forming performing operations so as to form a drill point at the free end of the smaller diameter portion of the blank and a head at the free end of the larger diameter porton of the blank, and thread rolling operations so asto form a first screw thread upon the smaller diameter portion of the blank adjacent the drilling point and a second screw thread having a larger crest diameter than that of the first screw thread upon the larger diameter portion of the blank adjacent the head.

With the arrangement in accordance with this invention the forming means at the transition region defined between the two diameters of the fastener is formed at the same time and by part means of the same operation as that forming the two diameters of fastener blank and this greatly simplifies the manufacturing operation for the fastener so as to produce a fastener which is technically as good as that described in GB-A-1277044 and yet which can be manufactured as inexpensively as that described in GB-A-1270545.

Preferably the transition zone is generally frusto-conical in shape and the forming means are defined by means of a projection which projects outwardly from the frusto-conical surface and has the form of a chordal segment cut from a diametrical slice through a hemisphere. Preferably more than one such projection is formed around the transition zone and the projections are arranged equi-angularly around the transition zone.

There can be a reduction in cross-sectional area as high as 70% between the smaller and larger diameter portions of the fastener if two dies are used and this can accordingly give rise to a corresponding increase in crest diameter of the second screw thread relative to that of the first screw thread. However, more usually, a reducton of cross-sectional area of approximately 30% is provided between the larger and smaller diameter portions of the fastener and this can be achieved within a single die by means of a single cold forward extrusion process. It is preferred that the unthreaded portion has a diametrical which is similar to that of the larger diameter threaded portion and, in this case, the transition zone is formed at the intersection between the first screw threaded portion and the unthreaded portion.

BRIEF DESCRIPTION OF THE DRAWINGS

A particular example of a fastener in accordance with this invention will now be described with reference to the accompanying drawings, in which.

DESCRIPTION OF THE PREFERRED EMBODIMENT

Figure 1:
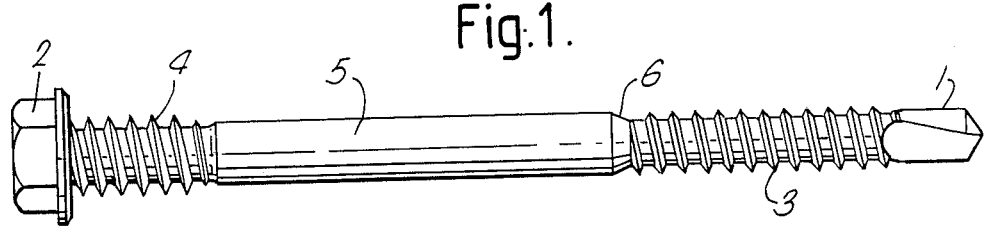
FIG. 1 is a side elevation of the fastener.
Figure 2:
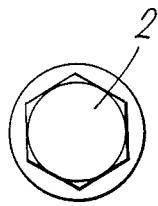
FIG. 2 is an end elevation showing the head of the fastener.

The fastener comprises a drilling tip 1 formed at one end and a head 2 at the other end, a first self-tapping screw thread 3 formed adjacent the drilling point 1 an a second screw thread 4 formed adjacent the head 2. An unthreaded portion 5 extends between the screw threads 3 and 4 and a transition portion 6 is located between the trailing end of the screw thread 3 and the unthreaded portion 5. The head 2, the second screw thread 4 and the unthreaded portion 5 are all formed from a portion of a screw blank having a large diameter of, for example 5.1 mm while the thread 3 and drilling point 1 are formed from a screw blank having a diameter of 4.55 mm.

Figure 3:
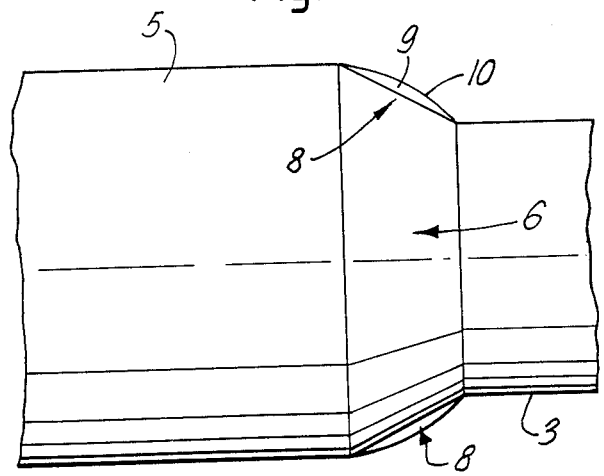
FIG. 3 is a side elevation drawn to a larger scale of the transition portion; and, FIG. 4 is a perspective view of the transition portion.

The transition portion 6 comprises a frusto-conical portion extending between the larger and smaller diameter portions of the fastener and two forming portions 8. The forming portions 8 include shoulders 9 and rounded faces 10. The forming portions 8 include rounded outer faces 10 and correspond to chordal segments of a diametrical slice through a hemisphere so that they are rounded both in a plane containing both segments and the axis of the fastener, as shown in FIG. 3 and are rounded in the circumferential sense.

In use such a fastener is intended to be used for attaching a corrugated sheet metal cover component to an underlying metal purlin. The drilling point 1 first drills a hole through the corrugated sheet and then the first screw thread 3 cuts a thread around the aperature. Further forward movement and rotating of the fastener urges the forming means 8 against the sidewalls of the aperature. The configuration of the forming means 8 rolls the corrugated sheet material downwardly as the transtion portion 6 moves through the hole. This operations firstly enlarges the hole so as to allow the larger diameter unthreaded portion 5 of the fastener to penetrate the corrugated sheet and secondly provides an apparent thickening of the sheet material so as to ensure better engagement of the second screw thread 4 with the sheet material. Further rotation and forward movement of the fastener causes the drilling point 1, to drill through the purlin and then the screw thread 3 cuts a screw thread within the purlin as it is screwed ino the purlin at the same time as the thread 4 engages the thickened region of the corrugated sheet.

Figure 4:
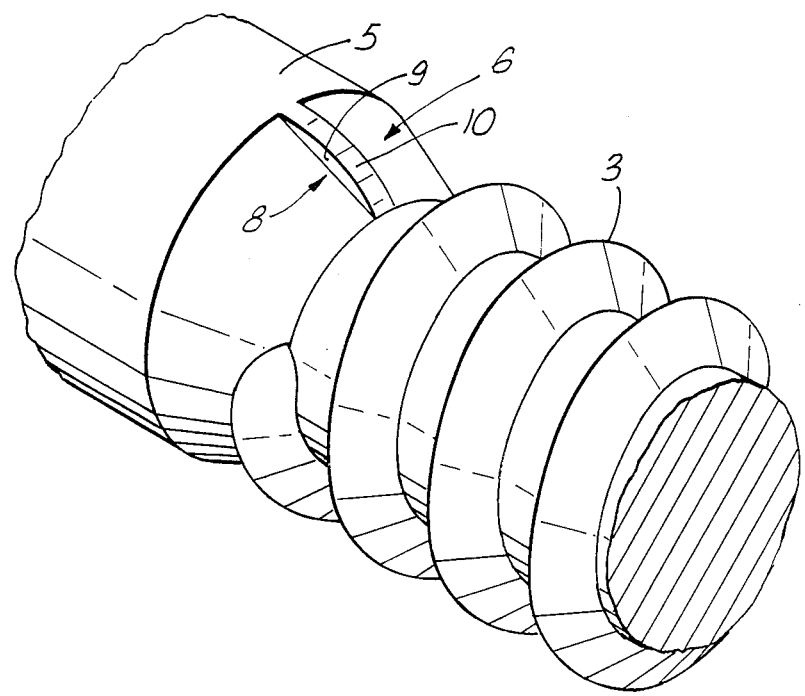

The fastener is fabricated by employing a blank having a diameter of 5.1 mm and subjecting this to a forward extrusion step so as to form the smaller diameter portion upon which the screw thread 3 and the drilling point 1 are formed. The blank is driven through a generally conical die having an input diameter of 5.1 mm and an exit diameter of 4.55 mm by means of a punch. The die includes a pair of diametrically opposed recesses having rounded bases formed by means of the cap of a sphere having a diameter of substantially 5.1 mm. Thus the die has a shape which is the inverse of the shape of the transition region 6 shown in FIG 4. Forward extrusion continues until the smaller diameter portion reaches an end stop. Further forward movement of the punch causes a further thickening of the large diameter portion of the blank thickening of the larger diameter portion of the blank so as to partly form the head 2. A second punch then completes the thickening of the larger diameter portion and the head 2 while the blank is still contained within the same die. The drilling point 1 is then formed at the free end of the smaller diameter portion of the blank and screw threads 3 and 4 are rolled onto the blank. The blank is subsequently case hardened so as to complete the fastener. Preferably the second screw thread 4 has an included flank angle of 30° so as to increase still further its crest diameter.

Obiviously, many modification and variations of the present invention are possible in light of the above teachings. It is therefore to be understood that within the scope of the appended claims, the present invention may be practiced otherwise than as specifically described herein.

I claim:

1. A screw threaded fastener, particularly intended for use in fastening corrugated sheet material to metal purlins, comprising:

a drilling point formed upon one end of said fastener;

a head portion formed upon an opposite second end of said fastener;

a first self-tapping screw threaded portion formed adjacent to said drilling point upon a first blank portion of said fastener having a first predetermined diameter;

a second screw threaded portion formed adjacent to said head portion upon a second blank portion of said fastener having a second predetermined diameter which is greater than said first predetermined diameter of said first screw threaded portion;

an unthreaded portion interposed and extending between said first and second screw threaded portions and having a diametrical extent which is substantially equal to said diameter of said second blank portion of said second screw threaded portion of said fastener and which is therefore greater than said diameter of said first blank portion of said first screw threaded portion;

a transition portion interposed between said first screw threaded portion and said unthreaded portion for smoothly interconnecting said first screw threaded portion, having said first predetermined diametrical extent, with said unthreaded portion having said second predetermined diametrical extent; and forming means formed upon said transition portion and projecting substantially radially outwardly from external surface portions of said transition portion for enlarging the diameter of a hole drilled within said sheet material by said drilling point so as to facilitate the passage of said unthreaded and second screw threaded portions through said sheet material.

2. The screw threaded fastener of claim 1, wherein said transition portion is generally frusto-conical in shape and wherein said forming means is formed by a projection projecting outwards from said frusto-conical surface and having the form of a chordal segment cut from a diametral slice through a hemisphere.

3. The screw threaded fastener of claim 2, wherein more than one said projection is formed around said transition portion, and wherein said projecting segments are arranged equi-angularly around said transition zone.

4. A fastener as set forth in claim 3, wherein: said projections are located upon diametrically opposed portions of said transition portion.

5. A fastener as set forth in claim 1, wherein: said unthreaded and first screw threaded portions of said fastener comprise cylindrical structures having circular configurations as seen in radially extending planes.

6. A fastener as set forth in claim 1, wherein: each of said first and second screw threaded portions has a screw thread crest diameter with the diametrical extent of said screw thread crest diameter of said second screw threaded portion being greater than the diametrical extent of said screw thread crest diameter of said first screw threaded portion.

7. A fastener as set forth in claim 1, wherein: the radially outward extent of said forming means does not exceed any radially outward dimension of said unthreaded portion of said fastener.

* * * * *